United States Patent
Wozniak (10) Patent No.: US 10,652,350 B2
(45) Date of Patent: May 12, 2020

(54) CACHING FOR UNIQUE COMBINATION READS IN A DISPERSED STORAGE NETWORK

(71) Applicant: International Business Machines Corporation, Armonk, NY (US)

(72) Inventor: Ethan S. Wozniak, Park Ridge, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 365 days.

(21) Appl. No.: 15/174,596

(22) Filed: Jun. 6, 2016

(65) Prior Publication Data

US 2017/0353575 A1    Dec. 7, 2017

(51) Int. Cl.
   *G06F 15/167*    (2006.01)
   *H04L 29/08*    (2006.01)
   *G06F 12/0813*    (2016.01)
   *G06F 12/0868*    (2016.01)
   *G06F 16/172*    (2019.01)

(52) U.S. Cl.
   CPC ...... *H04L 67/2842* (2013.01); *G06F 12/0813* (2013.01); *G06F 12/0868* (2013.01); *G06F 16/172* (2019.01); *H04L 67/1097* (2013.01); *G06F 2212/154* (2013.01); *G06F 2212/60* (2013.01); *G06F 2212/62* (2013.01)

(58) Field of Classification Search
   None
   See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Brian Whipple
*Assistant Examiner* — Gregory P Tolchinsky
(74) *Attorney, Agent, or Firm* — James Nock; Andrew D. Wright; Roberts Calderon Safran & Cole, P.C.

(57) ABSTRACT

A method includes receiving a first access request that indicates a first data object stored as encoded slices in a plurality of storage units. A first desired slice set is selected, based on the requesting module, that includes a first subset of encoded slices of the first data object. Absent slice data is generated based on searching a local cache, indicating an encoded slice not present in the local cache. A read request to read the encoded slice indicated by the absent slice data from one of the storage units is transmitted. The encoded slice indicated by the absent slice data from the storage unit is received and the local cache is updated to include the encoded slice. The first data object is regenerated for transmission to the first requesting module by decoding the first subset of encoded slices in the first desired slice set.

20 Claims, 4 Drawing Sheets

(56) References Cited

U.S. PATENT DOCUMENTS

| | | | |
|---|---|---|---|
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,766,422 | B2 * | 7/2004 | Beyda ............... G06F 17/30902 707/E17.12 |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2011/0055010 | A1 * | 3/2011 | Behroozi .......... G06F 17/30867 705/14.52 |
| 2011/0107026 | A1 * | 5/2011 | Quigley ............ G06F 11/1092 711/114 |
| 2012/0226933 | A1 * | 9/2012 | Baptist ............. G06F 11/0727 714/6.2 |
| 2014/0244788 | A1 * | 8/2014 | Resch ................ H04L 67/1097 709/217 |
| 2014/0351674 | A1 * | 11/2014 | Grube ............... G06F 11/1076 714/764 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): the Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

FIG. 1
distributed computing system 10

CACHING FOR UNIQUE COMBINATION READS IN A DISPERSED STORAGE NETWORK

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not applicable.

BACKGROUND OF THE INVENTION

Technical Field of the Invention

Aspects of this invention relate generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

DETAILED DESCRIPTION OF THE INVENTION

Figure 1:
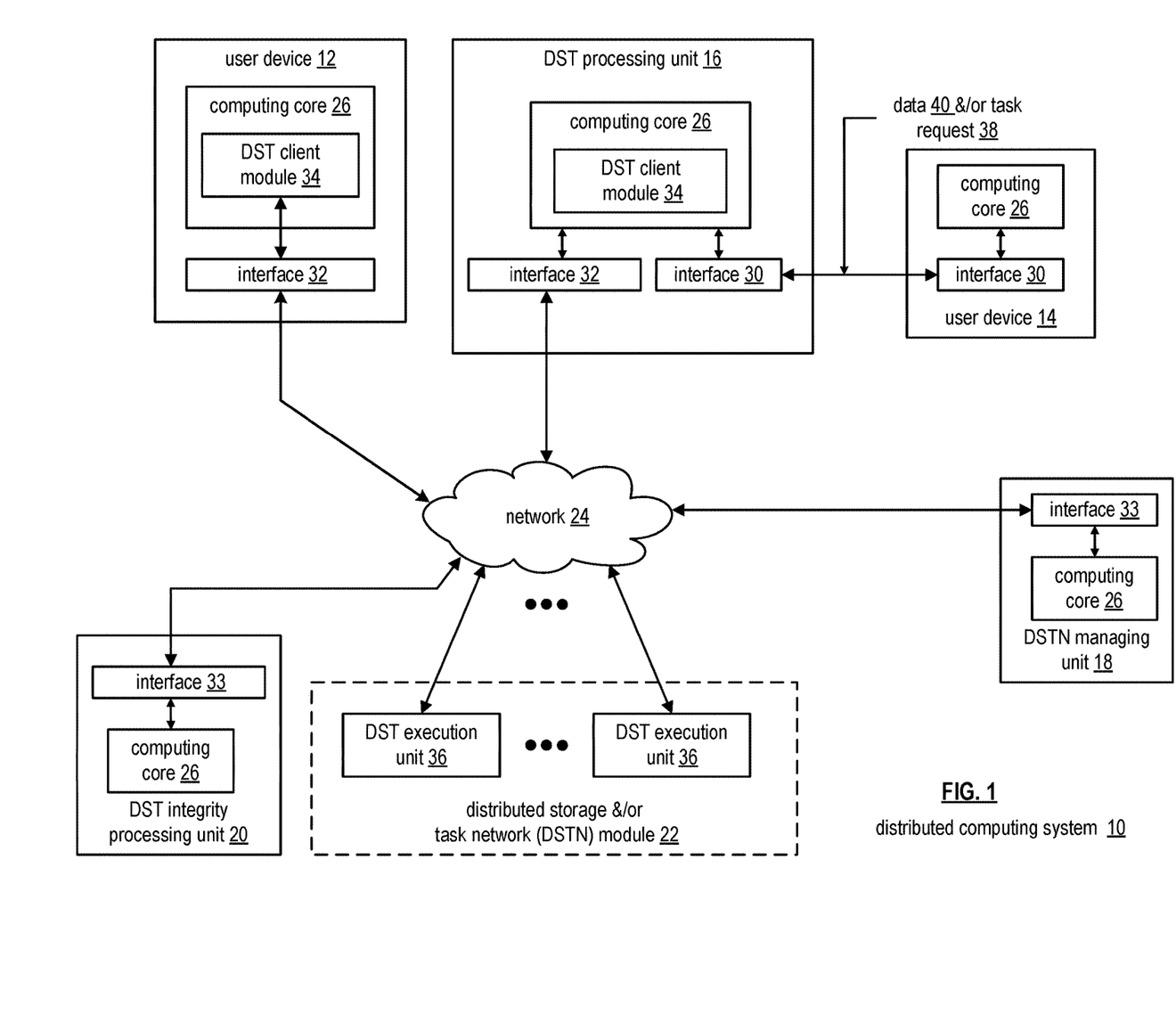
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN). Hereafter, the distributed computing system 10 may be interchangeably referred to as a dispersed storage network (DSN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, the DST execution unit may be interchangeably referred to as a storage unit and a set of DST execution units may be interchangeably referred to as a set of storage units.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34. While only one DST processing unit 16 is depicted in FIG. 1, the DSN can include a plurality of DST processing units 16, all connected to network 24.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval, and data storage integrity verification. In accordance with these three primary functions, data can be encoded (e.g., utilizing an information dispersal algorithm (IDA), utilizing a dispersed storage error encoding process), distributedly stored in physically different locations, and subsequently retrieved in a reliable and secure manner. Hereafter, distributedly stored may be interchangeably referred to as dispersed stored. Such a system is tolerant of a significant number of failures (e.g., up to a failure level, which may be greater than or equal to a pillar width (e.g., an IDA width of the IDA) minus a decode threshold minus one) that may result from individual storage device (e.g., DST execution unit 36) failures and/or network equipment failures without loss of data and without the need for a redundant or backup copy. Further, the distributed computing system 10 allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block associated with a portion of an overall namespace of the DSN) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated system registry information in one or more of the DSTN module 22, the user device 12, the DST processing unit 16, and the DST integrity processing unit 20.

The DS error encoding parameters (e.g., or dispersed storage error coding parameters for encoding and decoding) include data segmenting information (e.g., how many segments data (e.g., a file, a group of files, a data block, etc.) is divided into), segment security information (e.g., per segment encryption, compression, integrity checksum, etc.), error coding information (e.g., pillar/IDA width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

Each slice name is unique to a corresponding encoded data slice and includes multiple fields associated with the overall namespace of the DSN. For example, the fields may include a pillar number/pillar index, a vault identifier, an object number uniquely associated with a particular file for storage, and a data segment identifier of a plurality of data segments, where the particular file is divided into the plurality of data segments. For example, each slice name of a set of slice names corresponding to a set of encoded data slices that has been dispersed storage error encoded from a common data segment varies only by entries of the pillar number field as each share a common vault identifier, a common object number, and a common data segment identifier.

To support distributed task processing on received data, the distributed computing system 10 has two primary operations: DST (distributed storage and/or task processing) management and DST execution on received data. With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. With respect to the DST management, it is substantially similar to the DST management to support distributed task processing on received data.

In various embodiments, data sent to a DST processing unit for storage by a user device 12-14 can include one or more data objects. Each data object can have a unique, corresponding object identifier, object name, or object ID. In various embodiments, the object ID can be generated deterministically based on the data object itself, generated based on the user device, generated sequentially, and/or generated randomly. The object ID can be generated by the user device or requesting entity, or can be generated by the DST processing unit after the data is received from the user device. A set of encoded data slices can be generated to store a particular data object, where the set of encoded data slices corresponding to the data object are stored in one or more storage units. A subset of the encoded data slices can be decoded to regenerate the original data object.

Figure 2:
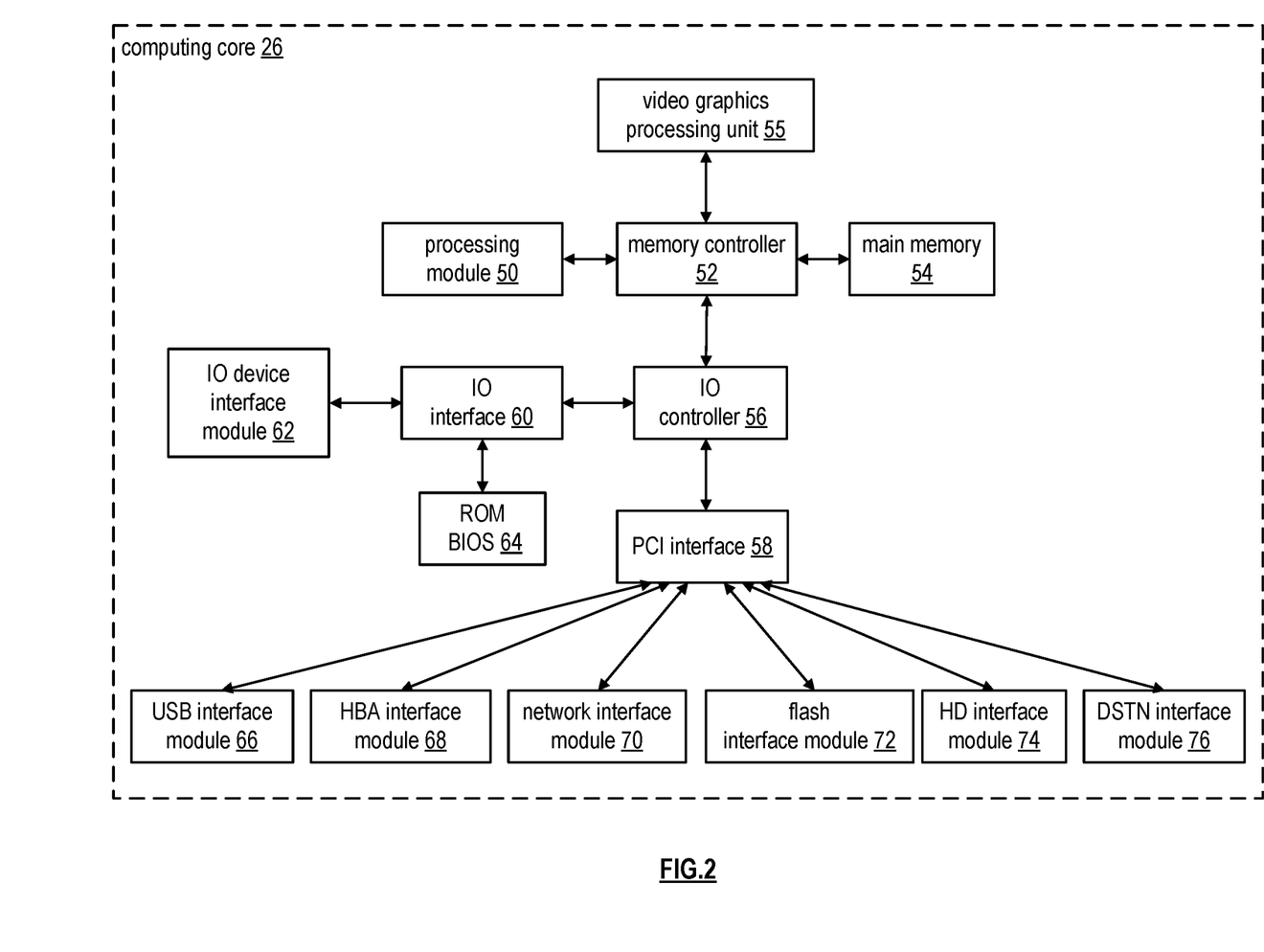
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
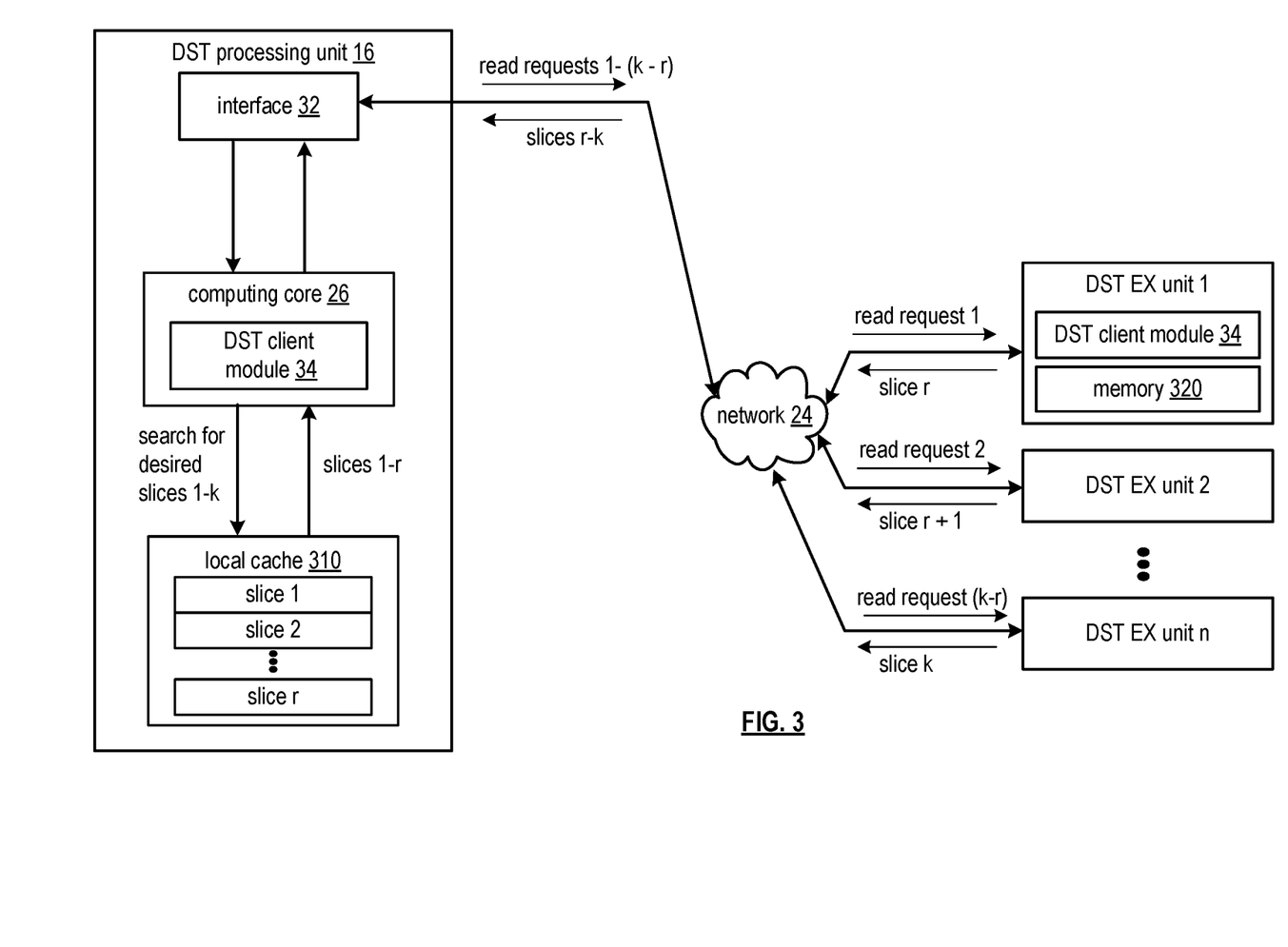
FIG. 3 is a schematic block diagrams of an embodiment of a dispersed storage network (DSN) in accordance with the present invention.

FIG. 3 is a schematic block diagram of another embodiment of a dispersed storage network (DSN) that includes the distributed storage and task (DST) processing unit 16 of FIG. 1, the network 24 of FIG. 1, and a set of DST execution (EX) units 1-*n*. Each DST execution unit includes the DST client module 34 of FIG. 1 and a memory 320. Memory 320 can be utilized by, for example, main memory 54 of FIG. 2. DST processing unit 16 includes interface 32 of FIG. 1, computing core 26 of figure one which can include DST client module 34 of FIG. 1, and a local cache 310. Hereafter, the set of DST execution units may be interchangeably referred to as a set of storage units and the DST execution unit may be interchangeably referred to as a storage unit. Each DST execution unit may be implemented utilizing the DST execution unit 36 of FIG. 1. The DSN functions to cache unique combination reads.

A DST processing unit that is part of a DSN memory utilizing Unique Combination Reads (UCR), may at times experience high demand for a given data object. One approach is, for each request, to issue a unique combination of read requests for those slices based on the requester. However, after a very small number of requesters, a DST processing until will generally have seen all slices for the given data object. Rather than burden storage units each time an access request comes in, the DST processing unit, may choose to cache all of the individual slices locally, and then with each read request that comes in, based on the requester, the DST processing until will select the correct combination of slices to use from those slices held in cache, apply the decoding function to recover the original content object, and then return the data object to the requester.

In various embodiments, a data object can be encoded and stored as a plurality of encoded data slices distributed amongst a plurality of storage units. In various embodiments, the number of data slices needed to decode and regenerate the original data object is less than the total number of data slices stored for the object. In various embodiments, k slices are necessary to decode the object, and there are n slices total. In various embodiments, any combination of k slices can be used jointly to decode the object. Each combination of k slices for a data object can be assigned to a particular requesting entity, where the requesting entity can be, for example, a user device 12-14. In such cases, the combination of k slices assigned to the communicating for the data object can be a unique combination of read requests for the object if the total number of requesting entities does not exceed C(n,k), the total number of possible combinations of k slices from the total number of slices n.

In various embodiments, retrieved slices from previous read requests can be stored in a cache of the DST processing unit. The cache can be included in the DST processing unit itself, or be connected to network 24, accessible by the DST processing unit. In various embodiments, every retrieved slice can be stored in the cache until a predefined size has been reached, or until a time stamp corresponding to the access is less recent than a predefined time. In various embodiments, only slices corresponding to read requests are stored. In other embodiments, slices indicated in write and/or task requests are also stored in the cache. In various embodiments, only slices corresponding to recent accesses are stored. In various embodiments, only slices corresponding to high demand data objects are stored. For example, the DST processing unit can determine that a data object or set of data objects has been accessed frequently, or is anticipated to be in high demand, and choose to store corresponding slices in the cache accordingly. In various embodiments, the DST processing unit can preemptively retrieve data slices from storage and add them to the cache, even without receiving a corresponding access request. For example, the DST processing unit can preemptively retrieve slices in response to determining the cache has space for more slices and/or a particular data slice will soon be in high demand. In various embodiments, the DST processing unit can retrieve all additional data slices for a particular object preemptively in response to adding at least one data slice of the data object to the local cache, for example, to ensure that all data slices of the data object are present in the cache and that no additional slices will need to be retrieved from storage units in subsequent requests for the data object. The DST processing unit can store slices in the cache based on capacity and/or performance considerations of particular storage units or the DST processing unit itself. In various embodiments, only slices stored in a particular set of storage units will be selected, for example, to help reduce traffic to those particular storage units in satisfying future requests.

In various embodiments, the DST processing unit can receive an access request indicating a data object from a requesting entity. For example, the access request can be a read request where no updates to the encoded slices are necessary. The DST processing unit can determine the unique combination of slices corresponding to the requesting entity, for example, based on an indication in the access request, a deterministic function performed on an identifier of the requesting entity, an entry of a lookup table, etc. Once the desired set of encoded slices corresponding to the data object is determines, the DST processing unit can check the cache can check the cache for encoded slices in response to receiving an access request from a requesting entity. For example, the first r encoded slices may be available in the cache, but the remaining k-r encoded slices require read requests from storage units. The DST processing unit can then retrieve any additional encoded slices not found in the cache from one or more storage units. In various embodiments, once the desired set of encoded slices are retrieved from the cache and/or storage units, the DST processing unit can decode the slice set to regenerate the data object for transmission back to the requesting entity.

In various embodiments, a processing system of a dispersed storage and task (DST) execution unit includes at least one processor a memory that stores operational instructions, that when executed by the at least one processor cause the processing system to receive a first access request from a first requesting module via a network that indicates a first data object, where the first data object is stored as a plurality of encoded slices in a plurality of storage units. A first desired slice set is selected based on the first requesting module, where the first desired slice set is a first subset of the plurality of encoded slices of the first data object. Absent slice data is generated based on searching a local cache, where the absent slice data indicates at least one encoded slice of the first desired slice set that is not present in the local cache. A read request to read the at least one encoded slice indicated by the absent slice data from at least one storage unit of the plurality of storage units is transmitted via the network. The at least one encoded slice indicated by the absent slice data from the at least one storage unit is received via the network. The local cache is updated to include the at least one encoded slice received from the at least one storage unit. The first data object is regenerated for transmission to the first requesting module via the network, where regenerating the first data object includes decoding the first subset of the plurality of encoded slices in the first desired slice set.

In various embodiments, the local cache includes all of the plurality of encoded slices for the first data object after the local cache is updated. In various embodiments, the local cache includes only encoded slices from a pre-defined subset of the plurality of storage units. In various embodiments, the absent slice data further indicates all encoded slices of the first data object that are not present in the local cache, including at least one encoded slice that is not a member of the first desired slice set, and the local cache includes the plurality of encoded slices of the first data object as a result of updating the local cache. In various embodiments, the local cache is updated to include all of a second plurality of encoded slices corresponding to a second data object in response to determining that the second data object is in high demand. In various embodiments, the local cache includes encoded slices of previous access requests based on recency of access of the encoded slice and/or frequency of access of the encoded slice. In various embodiments, the first desired slice set is unique to the first requesting module.

In various embodiments, a second read request to read the first data object is received from a second requesting module via the network. A second desired slice set is selected based on the second requesting module, where the second desired slice set is a second subset of the plurality of encoded slices of the first data object. The first data object is regenerated for transmission to the second requesting module via the network in response to determining that the entire second desired slice set is present in the local cache, where regenerating the first data object includes decoding the second subset of the plurality of encoded slices in the second desired slice set.

Figure 4:
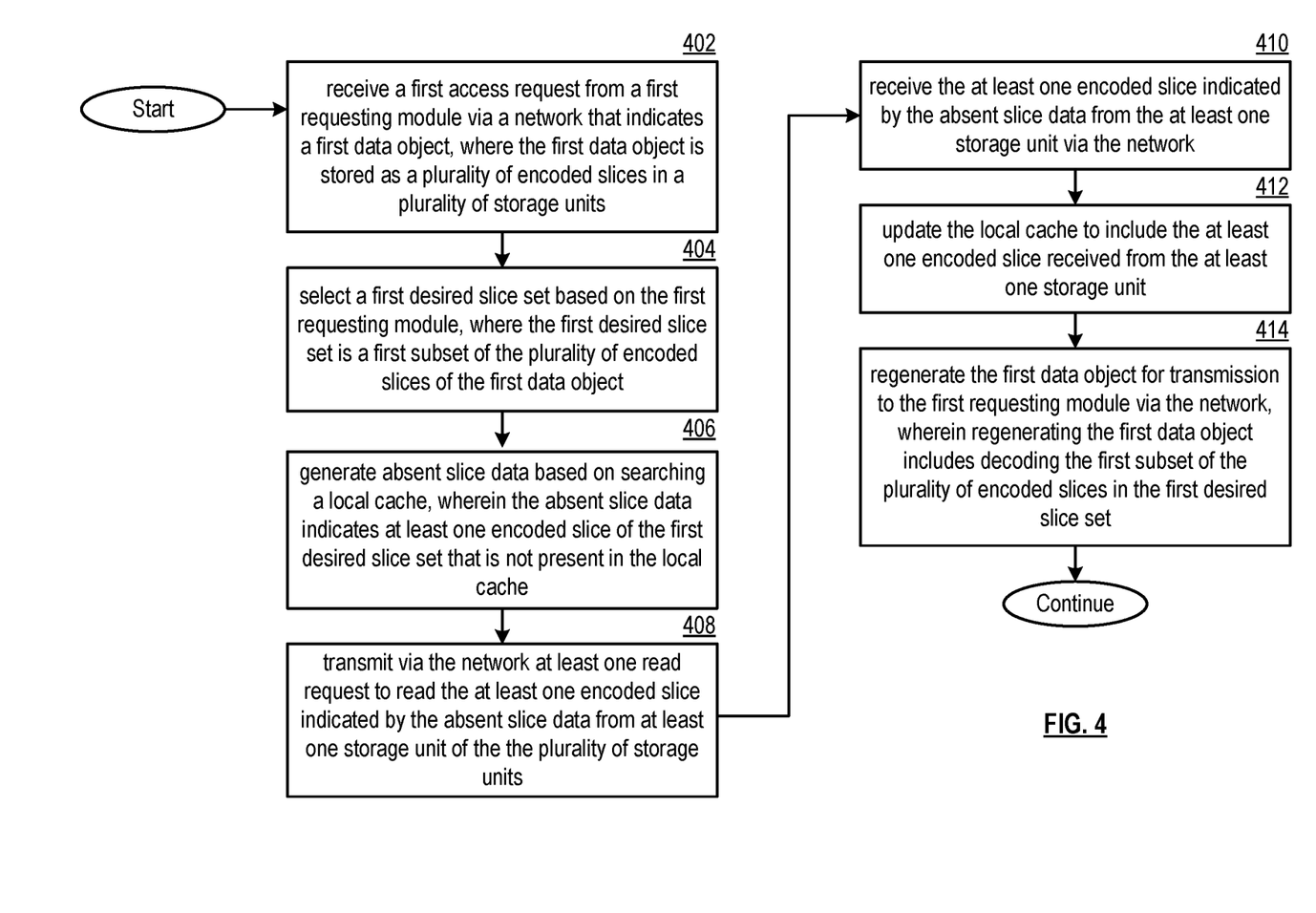
FIG. 4 is a flowchart illustrating an example of caching for unique combination reads in accordance with the present invention.

FIG. 4 is a flowchart illustrating an example of caching unique combination reads. In particular, a method is presented for use in conjunction with one or more functions and features described in conjunction with FIGS. 1-3 is presented for execution by a dispersed storage and task (DST) processing unit that includes a processor or via another processing system of a dispersed storage network that includes at least one processor and memory that stores instruction that configure the processor or processors to perform the steps described below. Step 402 includes receiving a first access request from a first requesting module via a network that indicates a first data object, where the first data object is stored as a plurality of encoded slices in a plurality of storage units. Step 404 includes selecting a first desired slice set based on the first requesting module, where the first desired slice set is a first subset of the plurality of encoded slices of the first data object. Step 406 includes generating absent slice data based on searching a local cache, where the absent slice data indicates at least one encoded slice of the first desired slice set that is not present in the local cache. Step 408 includes transmitting via the network a read request to read the at least one encoded slice indicated by the absent slice data from at least one storage unit of the plurality of storage units. Step 410 includes receiving the at least one encoded slice indicated by the absent slice data from the at least one storage unit via the network. Step 412 includes updating the local cache to include the at least one encoded slice received from the at least one storage unit. Step 414 includes regenerating the first data object for transmission to the first requesting module via the network, wherein regenerating the first data object includes decoding the first subset of the plurality of encoded slices in the first desired slice set.

In various embodiments, the local cache includes all of the plurality of encoded slices for the first data object after the local cache is updated. In various embodiments, the local cache includes only encoded slices from a pre-defined subset of the plurality of storage units. In various embodiments, the absent slice data further indicates all encoded slices of the first data object that are not present in the local cache, including at least one encoded slice that is not a member of the first desired slice set, and the local cache includes the plurality of encoded slices of the first data object as a result of updating the local cache. In various embodiments, the local cache is updated to include all of a second plurality of encoded slices corresponding to a second data object in response to determining that the second data object is in high demand. In various embodiments, the local cache includes encoded slices of previous access requests based on recency of access of the encoded slice and/or frequency of access of the encoded slice. In various embodiments, the first desired slice set is unique to the first requesting module.

In various embodiments, a second read request to read the first data object is received from a second requesting module via the network. A second desired slice set is selected based on the second requesting module, where the second desired slice set is a second subset of the plurality of encoded slices of the first data object. The first data object is regenerated for transmission to the second requesting module via the network in response to determining that the entire second desired slice set is present in the local cache, where regenerating the first data object includes decoding the second subset of the plurality of encoded slices in the second desired slice set.

The method described above in conjunction with the computing device and the storage units can alternatively be performed by other modules of the dispersed storage network or by other devices. For example, any combination of a first module, a second module, a third module, a fourth module, etc. of the computing device and the storage units may perform the method described above. In addition, at least one memory section (e.g., a first memory section, a second memory section, a third memory section, a fourth memory section, a fifth memory section, a sixth memory section, etc. of a non-transitory computer readable storage medium) that stores operational instructions can, when executed by one or more processing modules of one or more computing devices and/or by the storage units of the dispersed storage network (DSN), cause the one or more computing devices and/or the storage units to perform any or all of the method steps described above.

In various embodiments, a non-transitory computer readable storage medium includes at least one memory section that stores operational instructions that, when executed by a processing system of a dispersed storage network (DSN) that includes a processor and a memory, causes the processing system to receive a first access request from a first requesting module via a network that indicates a first data object, where the first data object is stored as a plurality of encoded slices in a plurality of storage units. A first desired slice set is selected based on the first requesting module, where the first desired slice set is a first subset of the plurality of encoded slices of the first data object. Absent slice data is generated based on searching a local cache, where the absent slice data indicates at least one encoded slice of the first desired slice set that is not present in the local cache. A read request to read the at least one encoded slice indicated by the absent slice data from at least one storage unit of the plurality of storage units is transmitted via the network. The at least one encoded slice indicated by the absent slice data from the at least one storage unit is received via the network. The local cache is updated to include the at least one encoded slice received from the at least one storage unit. The first data object is regenerated for transmission to the first requesting module via the network, where regenerating the first data object includes decoding the first subset of the plurality of encoded slices in the first desired slice set.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a dispersed storage and task (DST) processing unit that includes a processor, the method comprises:
   receiving a first access request from a first requesting module via a network that indicates a first data object, wherein the first data object is stored as a plurality of encoded slices in a plurality of storage units;
   selecting a first desired slice set based on an identifier of the first requesting module, wherein the first desired slice set includes a first subset of the plurality of encoded slices of the first data object;
   generating first absent slice data based on searching a local cache, wherein the first absent slice data indicates at least one encoded slice of the first desired slice set that is not present in the local cache;
   transmitting via the network at least one read request to read the at least one encoded slice indicated by the first absent slice data from at least one storage unit of the plurality of storage units;
   receiving the at least one encoded slice indicated by the first absent slice data from the at least one storage unit via the network;
   updating the local cache to include the at least one encoded slice received from the at least one storage unit;

regenerating the first data object for transmission to the first requesting module via the network, wherein regenerating the first data object includes decoding the first subset of the plurality of encoded slices in the first desired slice set;

receiving a second access request from a second requesting module via a network that indicates the first data object;

selecting a second desired slice set based on an identifier of the second requesting module, wherein the second desired slice set includes a second subset of the plurality of encoded slices of the first data object that includes the at least one encoded slice, and wherein the first subset of the plurality of encoded slices is different from the second subset of the plurality of encoded slices;

generating second absent slice data based on searching a local cache, wherein the second absent slice data indicates the second subset of the plurality of encoded slices is present in the local cache as a result of updating the local cache to include the at least one encoded slice received from the at least one storage unit; and regenerating the first data object for transmission to the second requesting module via the network, wherein regenerating the first data object includes decoding the second subset of the plurality of encoded slices in the second desired slice set by utilizing the second subset of the plurality of encoded slices stored in the local cache.

2. The method of claim 1, wherein updating the local cache includes transmitting, via the network, a second at least one read request to read a second at least one encoded slice from a second at least one storage unit of the plurality of storage units in response to determining the second at least one encoded slice corresponds to the first data object and is not included in the local cache, wherein the second at least one encoded slice is not a member of the first desired slice set, and wherein the local cache includes all of the plurality of encoded slices for the first data object after the local cache is updated.

3. The method of claim 1, wherein the local cache includes only encoded slices from a pre-defined subset of the plurality of storage units based on determining to reduce traffic to the pre-defined subset of the plurality of storage units.

4. The method of claim 1, wherein the first absent slice data further indicates all encoded slices of the first data object that are not present in the local cache, including at least one encoded slice that is not a member of the first desired slice set, and wherein the local cache includes the plurality of encoded slices of the first data object as a result of updating the local cache.

5. The method of claim 1, further comprising updating the local cache to include all of a second plurality of encoded slices corresponding to a second data object in response to determining that the second data object is in high demand.

6. The method of claim 1, wherein the local cache includes encoded slices of previous read access requests based on frequency of access of the encoded slices.

7. The method of claim 1, wherein the first desired slice set is unique to the first requesting module.

8. The method of claim 1, wherein the at least one encoded slice is included in an intersection of the first desired slice set and the second desired slice set.

9. A processing system of a dispersed storage and task (DST) execution unit comprises:

at least one processor;

a memory that stores operational instructions, that when executed by the at least one processor cause the processing system to:

receive a first access request via a network that indicates a first data object, wherein the first data object is stored as a plurality of encoded slices in a plurality of storage units;

select a first desired slice set based on an identifier of a first requesting module from which the first access request was received, wherein the first desired slice set includes a first subset of the plurality of encoded slices of the first data object;

generate first absent slice data based on searching a local cache, wherein the first absent slice data indicates at least one encoded slice of the first desired slice set that is not present in the local cache;

transmit via the network at least one read request to read the at least one encoded slice indicated by the first absent slice data from at least one storage unit of the plurality of storage units;

receive the at least one encoded slice indicated by the first absent slice data from the at least one storage unit via the network;

update the local cache to include the at least one encoded slice received from the at least one storage unit;

regenerate the first data object for transmission via the network, wherein regenerating the first data object includes decoding the first subset of the plurality of encoded slices in the first desired slice set receive a second access request via a network that indicates the first data object;

select a second desired slice set based on an identifier of a second requesting module from which the first access request was received, wherein the second desired slice set includes a second subset of the plurality of encoded slices of the first data object that includes the at least one encoded slice and wherein the first subset of the plurality of encoded slices is different from the second subset of the plurality of encoded slices;

generate second absent slice data based on searching a local cache, wherein the second absent slice data indicates the second subset of the plurality of encoded slices is present in the local cache as a result of updating the local cache to include the at least one encoded slice received from the at least one storage unit; and regenerate the first data object for transmission t via the network, wherein regenerating the first data object includes decoding the second subset of the plurality of encoded slices in the second desired slice set by utilizing the second subset of the plurality of encoded slices stored in the local cache.

10. The processing system of claim 9, wherein updating the local cache includes transmitting, via the network, a second at least one read request to read a second at least one encoded slice from a second at least one storage unit of the plurality of storage units in response to determining the second at least one encoded slice corresponds to the first data object and is not included in the local cache, wherein the second at least one encoded slice is not a member of the first desired slice set, and wherein the local cache includes all of the plurality of encoded slices for the first data object after the local cache is updated.

11. The processing system of claim 9, wherein the local cache includes only encoded slices from a pre-defined subset of the plurality of storage units based on determining to reduce traffic to the pre-defined subset of the plurality of storage units.

12. The processing system of claim 9, wherein the first absent slice data further indicates all encoded slices of the first data object that are not present in the local cache, including at least one encoded slice that is not a member of the first desired slice set, and wherein the local cache includes the plurality of encoded slices of the first data object as a result of updating the local cache.

13. The processing system of claim 9, wherein the operational instructions, when executed by the at least one processor further cause the processing system to update the local cache to include all of a second plurality of encoded slices corresponding to a second data object in response to determining that the second data object is in high demand.

14. The processing system of claim 9, wherein the local cache includes encoded slices of previous read access requests based on frequency of access of the encoded slices.

15. The processing system of claim 9, wherein the first desired slice set is unique to a requesting entity associated with the first access request.

16. The processing system of claim 9, wherein the at least one encoded slice is included in an intersection of the first desired slice set and the second desired slice set.

17. A non-transitory computer readable storage medium comprises:
at least one memory section that stores operational instructions that, when executed by a processing system of a dispersed storage network (DSN) that includes a processor and a memory, causes the processing system to:
receive a first access request from a first requesting module via a network that indicates a first data object, wherein the first data object is stored as a plurality of encoded slices in a plurality of storage units;
select a first desired slice set based on an identifier of the first requesting module, wherein the first desired slice set includes a first subset of the plurality of encoded slices of the first data object;
generate first absent slice data based on searching a local cache, wherein the first absent slice data indicates at least one encoded slice of the first desired slice set that is not present in the local cache;
transmit via the network at least one read request to read the at least one encoded slice indicated by the first absent slice data from at least one storage unit of the plurality of storage units;
receive the at least one encoded slice indicated by the first absent slice data from the at least one storage unit via the network;
update the local cache to include the at least one encoded slice received from the at least one storage unit;
regenerate the first data object for transmission to the first requesting module via the network, wherein regenerating the first data object includes decoding the first subset of the plurality of encoded slices in the first desired slice set
receive a second access request from a second requesting module via a network that indicates the first data object;
select a second desired slice set based on an identifier of the second requesting module, wherein the second desired slice set includes a second subset of the plurality of encoded slices of the first data object that includes the at least one encoded slice and wherein the first subset of the plurality of encoded slices is different from the second subset of the plurality of encoded slices;
generate second absent slice data based on searching a local cache, wherein the second absent slice data indicates the second subset of the plurality of encoded slices is present in the local cache as a result of updating the local cache to include the at least one encoded slice received from the at least one storage unit; and
regenerate the first data object for transmission to the second requesting module via the network, wherein regenerating the first data object includes decoding the second subset of the plurality of encoded slices in the second desired slice set by utilizing the second subset of the plurality of encoded slices stored in the local cache.

18. The non-transitory computer readable storage medium of claim 17, wherein the operational instructions, when executed by the processing system, further cause the processing system to: update the local cache to include all of a second plurality of encoded slices corresponding to a second data object in response to determining that the second data object is in high demand.

19. The non-transitory computer readable storage medium of claim 17, wherein the local cache includes encoded slices of previous read access requests based on frequency of access of the encoded slices.

20. The non-transitory computer readable storage medium of claim 17, wherein the at least one encoded slice is included in an intersection of the first desired slice set.

* * * * *